US007796142B2

(12) United States Patent
Villers

(10) Patent No.: US 7,796,142 B2
(45) Date of Patent: Sep. 14, 2010

(54) DISPLAY SCREEN CAPABLE OF BEING SUBJECTED TO A SCROLL PROCEDURE

(75) Inventor: Jean-Stéphane Villers, Cergy (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 909 days.

(21) Appl. No.: 10/531,217

(22) PCT Filed: Oct. 13, 2003

(86) PCT No.: PCT/FR03/03012

§ 371 (c)(1),
(2), (4) Date: Aug. 31, 2006

(87) PCT Pub. No.: WO2004/035702

PCT Pub. Date: Apr. 29, 2004

(65) Prior Publication Data

US 2007/0146377 A1 Jun. 28, 2007

(30) Foreign Application Priority Data

Oct. 16, 2002 (FR) .................................. 02 12859

(51) Int. Cl.
*G09G 5/00* (2006.01)
*G06F 12/02* (2006.01)

(52) U.S. Cl. ....................... 345/684; 345/685; 345/686; 345/687; 345/688; 345/543

(58) Field of Classification Search ................. 345/543, 345/682–688
See application file for complete search history.

(56) References Cited

U.S. PATENT DOCUMENTS

| | | | | |
|---|---|---|---|---|
| 4,920,504 | A | 4/1990 | Sawada et al. | |
| 5,900,872 | A * | 5/1999 | Ashe | 715/786 |
| 6,802,061 | B1 * | 10/2004 | Parthasarathy et al. | 717/173 |

FOREIGN PATENT DOCUMENTS

| | | | |
|---|---|---|---|
| EP | 0235594 | A2 | 9/1987 |
| EP | 0 403 416 | A2 | 12/1990 |
| EP | 1 055 993 | A1 | 11/2000 |
| EP | 1164499 | A1 | 12/2001 |

* cited by examiner

*Primary Examiner*—Hau H Nguyen
(74) *Attorney, Agent, or Firm*—Osha • Liang LLP

(57) ABSTRACT

The invention concerns a method for displaying a document on a display screen capable of being subjected to a scroll procedure, involving the following steps: providing the document with an amount of graphic memory to create a buffer memory of the visible part of the document and zones nearest to said visible part; calculating and cutting out into pixmaps said memory; relatively positioning said pixmaps with respect to the entire document and its visible part; filling up the content of the pixmaps, when the document is subjected to a display or scroll procedure, recopying the pixmap content in the display window; and repeating the relative positioning of the pixmaps with respect to the document.

16 Claims, 3 Drawing Sheets

DISPLAY SCREEN CAPABLE OF BEING SUBJECTED TO A SCROLL PROCEDURE

FIELD OF THE ART

The present invention relates to a method of displaying a document, for example an HTML (Hypertext mark-up language) page, on a display screen capable of being subjected to a scroll procedure, for example on a digital television screen.

STATE OF THE PRIOR ART

The field of the invention is in particular that of the displaying of HTML pages, as described in patent application EP 1 164 499.

A version of the HTML standard ("HTML 4.01 Specification W3C Recommendation 24 Dec. 1999") may be found at the following Internet address http://www.w3.org/TR/1999/REC-htmT401-1999 1224.

An HTML page is a document which can be interpreted by a reading program to produce a visual, and possibly audio, output on a computer monitor or on a television screen. An HTML page presented on a screen ordinarily consists of a main document and of secondary documents that may contain graphical or sound elements, or source code.

In order to take account of this HTML page, these elements are loaded, stored in memory and processed by an HTML engine. The representation of this page is stored in a graphics memory for display.

An HTML engine is an interactive application making it possible to display hypertext and multimedia documents that can be accessed through the Internet network. It also makes it possible to send and receive electronic mail and to consult so-called "news" servers.

In the field of digital television an interactive application such as this is driven by the user by means of a remote control or with the aid of an infrared keypad. The application may, in fact, integrate a substitution interface allowing the user to perform all the entries of text or the like with the remote control alone. The displaying of the documents is carried out on the screen.

The retrieval of the documents on the Internet network is performed by way of queries on particular servers. In the field of digital television this operation may be asymmetric. Specifically, the query and the document do not necessarily travel through the same medium: the query may be made through the telephone network via a modem, and the document may return either through the antenna, that is to say through satellite transmission, or through the modem. The user can then choose the type of return.

The content of an HTML page may exceed the space available on the monitor or on the television screen. In this case the monitor or the television screen displays only a part of the HTML page. The user can then scroll the display to get a glimpse of the remaining parts of the HTML page.

After scrolling, the new visible part of the HTML document must be displayed. Each graphical element intersecting with the new visible part must be drawn or redrawn.

The scrolling of a document is commonly carried out in several ways. The simplest fashion is display without prior preparation in a buffer graphics memory, that is to say by drawing directly in the window displayed on the screen. Should the document be scrolled, the content of the window always remaining visible is displaced by a mass copy to its new position in the window. The remaining band, newly appeared, is displayed by individually redrawing each graphical object. This method has the drawback, when the graphical system is slow, of seeing the drawing of each of the graphical objects be composed progressively.

To remedy this problem, a solution used is to prepare the part of the document to be displayed in a buffer graphics memory such as for example a pixmap and to display in one go the content of this pixmap in the visible window. Here two techniques are used. The first consists in having this buffer memory cover only the visible zone of the document. In this case, when a scroll is requested the new visible portion of the document is prepared in the buffer memory and when the latter is ready, it is displayed (technique called "double buffering"). The second consists in covering the entire document with a buffer graphics memory, preparing the entire document and displaying it as and when required.

The major problems of these two techniques are that, in the first, the display is prepared upon an explicit scroll request. Consequently, a certain time that is a nuisance for the user may occur between the request and the actual scrolling, the scrolling not being fluid. In the second, though the problem of waiting time does not exist, it may require a large quantity of graphics memory since the latter is related to the size of documents. On the Internet network, the size of the documents is not limited and the quantity of graphics memory required in order to use this second technique may be considerable.

Such a solution is not, either, suitable for the display of a decoder since the latter requires a sizable memory to store the pixmap data which are calculated before display. Now, the memory capacity of a television decoder is limited. It is for example of the order of 2 megabytes of graphics memory. It is therefore appreciably more limited than that of a computer which may be 32 megabytes, or 64 megabytes, etc.

An objective of the invention is to solve such a problem, that is to say to offer fluid scrolling of a document in a context of limited memory, this document possibly for example being an HTML page.

DESCRIPTION OF THE INVENTION

The present invention relates to a method of displaying a document on a display screen capable of being subjected to a scroll procedure, characterized in that it comprises the following steps:

- a step of allocating the document a quantity of graphics memory so as to create a buffer memory of the visible part of the document and of the zones closest to this visible part and referred to as "anticipation bands",
- a step of calculating and of chopping of this memory into pixmaps as a function of the size of the document, of the visible part, and of those of the anticipation bands,
- a step of relative positioning of these pixmaps with respect to the complete document and its visible part,
- a step, that can be carried out as a background task, of filling the content of the pixmaps with a priority system dependent on the proximity of the pixmap with respect to the visible zone,
- when the document is subjected to a display procedure or to a scrolling, a step of copying the content of the pixmaps into the display window with previously if necessary a step forcing the updating of the pixmaps involved in the display if the previous step has not terminated same,
- and return to the step of relative positioning of the pixmaps with respect to the document as a function of the new position of the visible part.

Advantageously in the case of horizontal and vertical scrolling, the anticipation bands comprise a minimum of one column of pixmaps on the right and on the left of the visible window as well as a row of pixmaps at the bottom and at the top, except in the case where the visible window approaches the edge of the document. The pixmaps are chopped into rectangles which are drawn successively with each call of a background task.

The filling of a pixmap if it is of large size may be lengthy and disable the system for the time of the operation. The filling of the pixmaps by rectangles of small sizes makes it possible to dilute the filling operation among the other processing operations of the system, and to be able to respond rapidly to the user if necessary.

The background task also has the function of constructing the anticipation zone.

With each call of this background task, the process is as follows:

possible reorganization of the pixmaps if a scroll has been performed, if no repositioning of the pixmaps has occurred, drawing of the first rectangle of a pixmap determined as a function of a criterion of distance away from the visible zone of the document.

Advantageously the method of the invention uses a synchronization mechanism allowing the possible forcing of the data to be displayed into the pixmaps.

An immediate drawing is carried out in two cases:

when an "expose" event compels the drawing of a part of the display window though this part has not yet been drawn in the anticipation bands, when an element of the document is modified graphically in the display window.

The method of the invention may in particular be used for the display of an HTML document, and/or for a digital television decoder.

DETAILED DESCRIPTION OF PARTICULAR EMBODIMENTS

The method, according to the invention, of displaying a document, for example an HTML page, on a display screen capable of being subjected to a scroll procedure consists in chopping this document into zones that may be covered by pixmaps whose size is dependent on the size of the display zone, and in providing a zone anticipating part of the document actually covered by pixmaps.

This anticipation zone forms a matrix of pixmaps, covering the document, the visible part and the closest bands around this visible part, in such a way as to prepare the content of the visible part and the zones that will soon be visible should the document be scrolled.

The purpose of the anticipation zone is to improve the visual rendition of the operations of redrawing a part of the document. Specifically, in most cases, a copy of the anticipation zone in the display window turns out to be sufficient.

Figure 1:
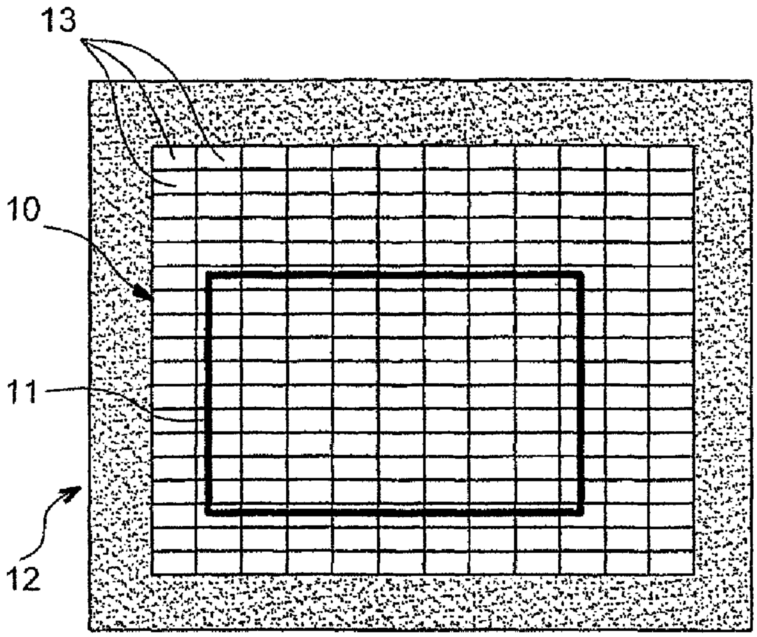
FIG. 1 illustrates the displaying of the anticipation zone according to the method of the invention.
Figure 7:
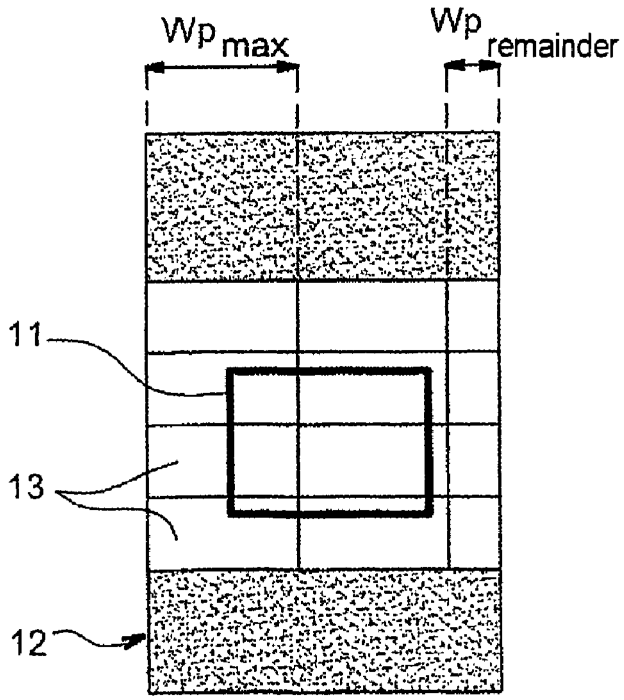

FIG. 1 represents such an anticipation zone 10, here formed of 18 rows and 12 columns of pixmaps 13, the visible window 11 where the document 12 is displayed. Note the hierarchical inclusion of the three zones thus formed, the document 12 including the anticipation zone 10, the latter containing the visible window 11 of the document. The anticipation zone may indeed cover the document widthwise or heightwise if the space available is sufficient, as shown by the illustration of FIG. 7.

Figure 2:
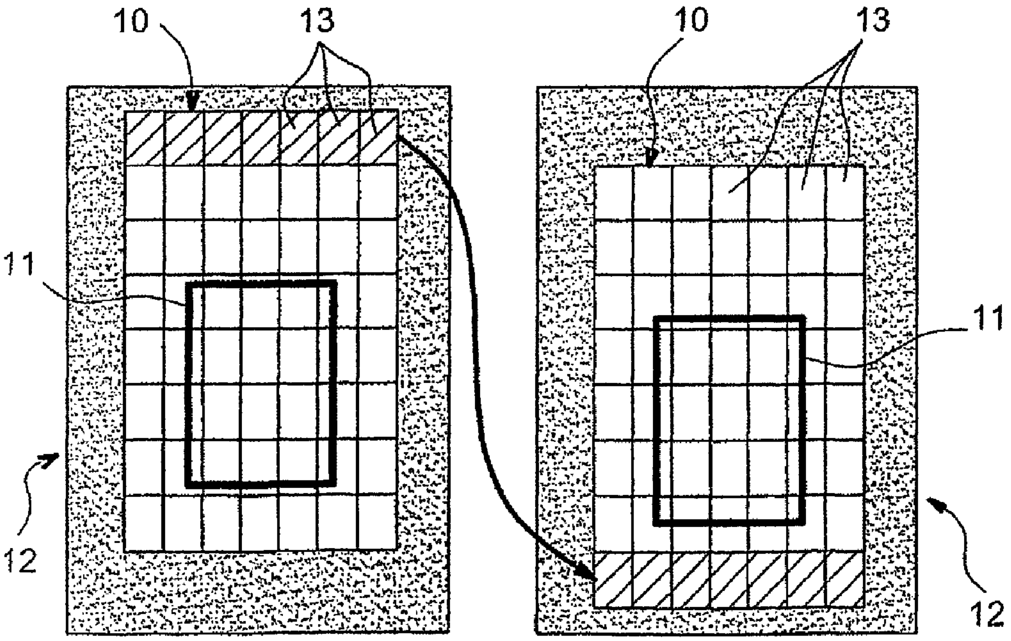
FIG. 2 illustrates an exemplary displacement of the anticipation zone.

FIG. 2 shows the evolution of the anticipation zone 10 following an operation of scrolling the display of the document 12 downwards. This scrolling operation entails a displacement of the first row at the bottom of the anticipation zone. This row must then be redrawn.

The anticipation zone comprises a minimum of one column of pixmap zones on the right and on the left of the visible window as well as a row of pixmap zones at the bottom and at the top, except in the case where the visible window 11 approaches the edge of the document 12. If this rule is not complied with following a scroll, the anticipation zone displaces in such a way as to reestablish the latter.

So as not to risk disabling the application for several seconds, the drawing of the anticipation zone, following its creation or a scroll, is such that a background task performs this drawing in several steps: the pixmap zones are formed as rectangles that are drawn successively on each call of the background task.

This background task also has the function of constructing the anticipation zone.

With each call of this background task, the process is as follows:

displacement if necessary of the anticipation zone by permutation of pixmap rows or columns, if the anticipation zone is correctly positioned, drawing of the first rectangle of a pixmap of the anticipation zone.

If the pixmap to be displayed is not ready at the moment of display, a synchronization mechanism makes it possible to force the refreshing of the data to be displayed in the pixmaps.

An immediate drawing is carried out in two cases:

when an "expose" event compels the drawing of a part of the display window though this part has not yet been drawn in the anticipation zone, or when an element of the document is modified graphically in the display window.

These two cases correspond respectively to an influx of new data relating to an image and to the processing of the focus which modifies the drawing of an element of the image.

Figure 3:
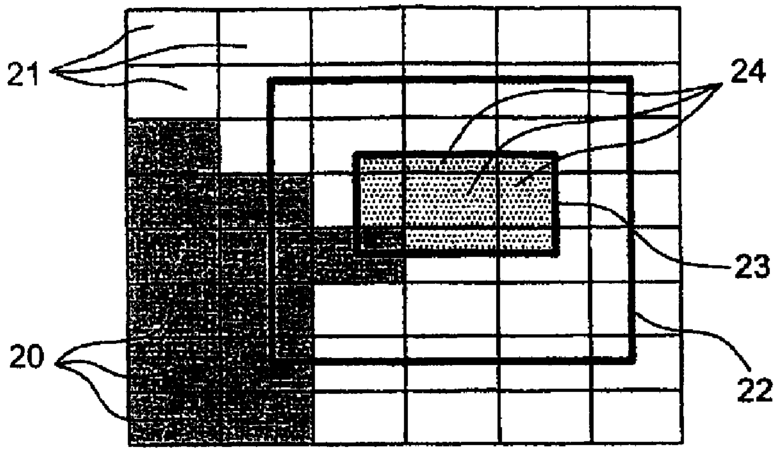
FIG. 3 illustrates the synchronization mechanism, when a part of the pixmaps is not filled and when a display is requested.

In both these cases all the waiting rectangles having a common intersection with the zone to be drawn are drawn. FIG. 3 represents the elements which then make up the anticipation zone:

the rectangles already drawn 20, the undrawn rectangles 21, the display window 22, the rectangle 23 to be drawn following an "expose" event, the undrawn rectangles 24 which intereact with the rectangle 23, the drawing of their content being forced by the synchronization.

Implementation of the Method of the Invention in an HTML Application

We shall now consider an exemplary implementation of the method of the invention, in an HTML application in a decoder.

The first operation consists in dividing up the usable graphics memory into a tree of subwindows (or HTML "frames").

The quantity of graphics memory available to create the pixmaps is limited at the decoder level. To guarantee that the other applications that are functioning at the same time as the HTML engine function properly, only a part of this memory is used by the HTML engine to create the anticipation zones. The quantity of memory available is defined when the HTML engine is launched. In the case where several drop-down documents are visible simultaneously on the screen (case of HTML subwindows or "frames"), each document must be able to profit from the fluid scrolling mechanism that the method of the invention constitutes. The quantity of memory available must therefore be divided up between all the documents that are visible simultaneously.

The method of the invention relates only to drop-down documents. The documents declaring HTML subwindows can never be drop-down. Only the leaf documents of a tree of subwindows may be drop-down, and are therefore potential users of the method of the invention. Thus, the sum of the visible parts of the HTML documents that is able to be drop-down exactly covers the area reserved for the display of the HTML engine. This property is used to guarantee a use of the method of the invention for each leaf document.

The HTML engine divides up the graphics memory proportionately, as a function of the area of each subwindow:

M represents the quantity of graphics memory reserved for the HTML engine,

Wm & Hm: the size in pixels of the display window of the HTML engine,

Wf & Hf: the size in pixels of any subwindow.

The quantity of graphics memory usable by this subwindow to create its anticipation zones is proportional to the area:

$$Mf=M*(Wf*Hf)/(Wm*Hm)$$

Figure 4:
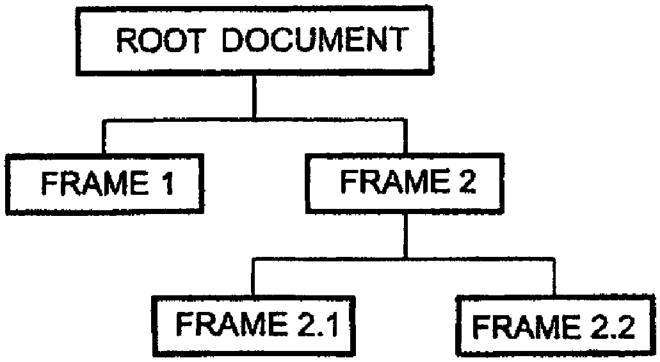
FIG. 4 illustrates the makeup of a tree of subwindows in an exemplary implementation of the method of the invention.

An exemplary subwindow tree, in which each box constitutes an HTML document, is illustrated in FIG. 4. There is thus a root document, for example of 600×400 pixels, which gives rise to a document Frame 1, for example of 600×100 pixels, and a document Frame 2, for example of 600×300 pixels, which gives rise to a document Frame 2-1, for example of 200×300 pixels and a document Frame 2-2, for example of 400×300 pixels.

Figure 5:
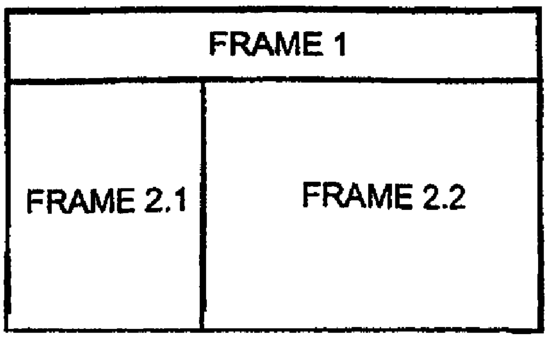
FIG. 5 illustrates the display of the tree represented in FIG. 4.

The display of such a tree gives the result illustrated in FIG. 5.

In such an example the division of the graphics memory may be effected in the following manner, with, M=1,920 Kbytes:

Root document (declaration of frames)=0 bytes

"Frame 1" (leaf document)=480 Kbytes

"Frame 2" (declaration of frames)=0 bytes

"Frame 2.1" (leaf document)=480 Kbytes

"Frame 2.2" (leaf document)=960 Kbytes

The following operation is a problem of determining the granularity of the pixmaps: for a quantity of graphics memory available for a document it is necessary to determine what size and granularity of the pixmaps will allow the system to function properly. The objective is to guarantee at least one increment of scrolling, of anticipation of the motion on either side of the visible zone, and to have at least one row of pixmaps that can be displaced on one side or the other.

Figure 6:
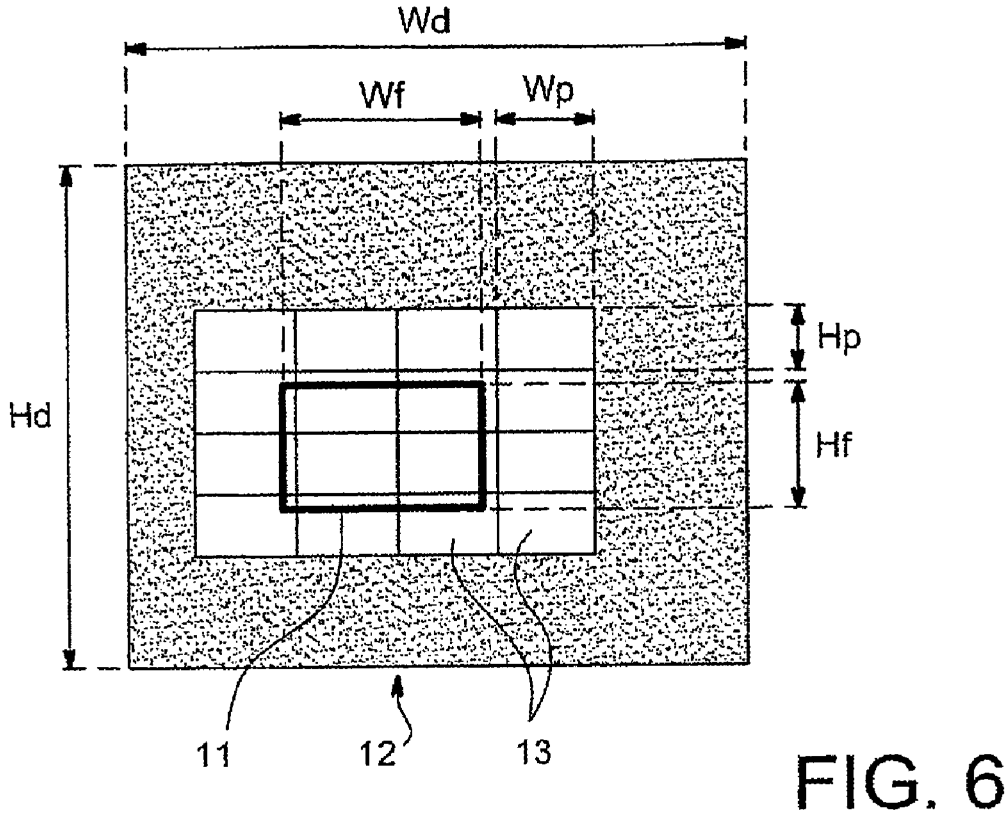
FIGS. 6 and 7 each illustrate an HTML document after page setup according to the method of the invention; the complete width of the document being coverable with the pixmaps for FIG. 7, while for FIG. 6 this is not possible.

FIG. 6 represents a complete HTML document 12 after page setup, the part covered by the pixmaps 13 and the visible part 11. This document 12 may at one and the same time have a horizontal scroll and a vertical scroll.

Represented in this figure are the following parameters:

Wd & Hd: width and height in pixels of the complete document after page setup,

Wd & Hf: width and height in pixels of the visible part of the document (size of the subwindow), Wp & Hp: width and height in pixels of a pixmap.

There are other parameters that are not represented in this figure:

Nx & Ny: number of pixmaps horizontally or vertically,

Px & Py: anticipation band guaranteed available horizontally and vertically on either side of the visible zone (this anticipation band corresponds, as a minimum, to the scroll increment), T: size of a pixel in bytes (dependent on the color coding system), Mf: quantity of graphics memory available for the pixmaps associated with the document.

It is firstly considered that the document 12 can be scrolled horizontally and vertically and that the quantity of graphics memory is insufficient to cover the whole of the document with pixmaps both horizontally and vertically.

To be able to guarantee the permutation of the pixmaps and also at the same time the existence of a guaranteed anticipation band on each side, the following inequalities must be complied with:

$$2Px+Wf \leqq Wp(Nx-1)+1 \text{ with } Nx>1 \quad (1)$$

$$2Py+Hf \leqq Hp(Ny-1)+1 \text{ with } Ny>1 \quad (2)$$

The memory limitation also imposes a constraint. The sum of the pixmaps must not exceed the quantity of memory reserved:

$$Mf \leqq Nx*Ny*Wp*Hp*T \quad (3)$$

The number of equations is still insufficient to determine the number and the size of the pixmaps. Hence, we opt for certain particular conditions:

Px, the guaranteed horizontal anticipation zone is defined as equal to the horizontal scroll increment.

Py, the guaranteed vertical anticipation zone is defined as equal to the vertical scroll increment.

Px=α Wf: the horizontal increment of scrolling is proportional to the width of display of the document.

Py=α Hf: the vertical increment of scrolling is proportional to the height of display of the document with $0<\alpha\leqq 1$, α being a constant of the HTML engine (constraint guaranteeing that the whole of the document can be consulted by incremental scrolling).

(Wp*Nx)*Hf=(Hp*NY)*Wf (4): the dimensions of the anticipation zone are proportional to the dimensions of the display zone.

The size and the number of pixmaps horizontally are determined using equations (3) and (4) and by considering that the maximum capacity of the graphics memory must be used. The following result is obtained:

$$W_p*Nx=((Mf*Wf)/(Hf*T))^{1/2} \quad (5)$$

where Wp*Nx corresponds to the width in pixels of the anticipation zone.

By using equations (1) and (5) we obtain the maximum width of a pixmap:

$$W_{pmax}=((Mf*Wf)/(Hf*T))^{1/2}+1-(2\alpha+1)Wf$$

By dividing the width of the anticipation zone (Wp*Nx) of (5) by the maximum width of a pixmap $Wp_{max}$ and by rounding up to the next integer, we obtain the minimum number of pixmap zones widthwise $Nx_{min}$.

For all of the values of $Nx \leqq Nx_{min}$, the proper functioning of the method of the invention is assured. In the implementation of the HTML engine, it is the value $Nx_{min}$ which is retained for the chopping. Specifically, at the decoder level, the number of pixmaps that can be created is limited. The possibility of using the method of the invention is thus guaranteed to the maximum and the attaining of a critical value such as this is therefore avoided.

The actual width of a pixmap Wp is obtained by dividing the width of the anticipation zone (WP*Nx) of (5) by the retained number of pixmaps $Nx_{min}$ rounded down to the next integer.

In the example of "Frame 2.2", by taking a coefficient $\alpha$ at 10% and T=4 bytes, the results obtained are as follows:

Nx=7

Wp=80 pixels

The determination of the size and of the number of pixmaps vertically is carried out in the same manner as horizontally.

In the example considered, the results obtained for "Frame 2.2" are as follows:

Ny=7

Hp=60 pixels

With this calculation scheme, the granularity of the pixmaps is always the same horizontally and vertically.

In the implementation of the decoder, it is necessary to take account of an additional parameter: the pixmaps created must always have dimensions that are multiples of 8 pixels. Consequently, after having determined the size of each pixmap and the number of pixmaps in a direction, while rounding this size down to a multiple of 8, we check that equation (1) or (2) in the first direction processed is still satisfied. If this is no longer the case, the granularity of the pixmaps must be increased by 1 and the new size of a pixmap must be recalculated.

With these roundings, part of the memory reserved for the calculation in a direction may no longer be fully used. This memory surplus is then carried over to the other direction before calculating the size and the number of pixmaps. Under these new conditions, the horizontal and vertical granularity may become different.

As illustrated in FIG. 7, in the case where $Wp*Nx \leqq Wd$, it is possible to cover the entire width of the document with pixmaps. There is therefore no need for a horizontal permutation mechanism. The determination of the number and the granularity of the pixmaps is different. The surplus of graphics memory available at the horizontal scroll level is assigned to the vertical scroll. The width of the pixmaps is then the maximum width of creation of a pixmap in a decoder.

The invention claimed is:

1. A method of displaying a document on a display screen capable of being subjected to a scroll procedure, comprising:

allocating to the document a quantity of graphics memory to create a buffer memory for a visible part of the document and for an anticipation band of zones closest in physical proximity to the visible part of the document, wherein the anticipation band comprises content anticipated to be shown in the visible part of the document after the document is scrolled;

calculating and chopping the buffer memory into pixmaps as a function of a size of the document, of the visible part, and of the anticipation band, relative positioning of the pixmaps with respect to the complete document and the visible part, filling the content of the pixmaps with a priority system dependent on the proximity of the pixmap with respect to a visible zone, when the document is subjected to a display procedure or to scrolling, copying the content in the pixmaps of the anticipation band into the visible window and redrawing the anticipation band, wherein when the content is not ready for display, forcing updating of the pixmaps to be displayed in the visible part prior to copying the content and, relatively positioning the pixmaps with respect to the document as a function of the new position of the visible part.

2. The method as claimed in claim 1, wherein the anticipation band comprises a minimum of: one column of pixmaps on the right and on the left of the visible window and a row of pixmaps at the bottom and at the top of the visible window, except in the case where the visible part approaches an edge of the document.

3. The method as claimed in claim 1, wherein the pixmaps are chopped into rectangles which are drawn successively with each call of a background task.

4. The method as claimed in claim 3, wherein the background task constructs the anticipation band.

5. The method as claimed in claim 3, wherein each call of this background task, comprises:

reorganization of the pixmaps after a scroll of the document has been performed, and when no repositioning of the pixmaps has occurred, drawing of the first rectangle of a pixmap determined as a function of distance away from the visible part of the document.

6. The method as claimed in claim 1, wherein a synchronization mechanism is used to allow the forcing of the data to be displayed into the pixmaps.

7. The method as claimed in claim 1, wherein an immediate drawing is carried out when one of:

an "expose" event compels the drawing of a part of the visible part of the document that has not been drawn in the anticipation band, and an element of the document is modified graphically in the display window.

8. The method as claimed in claim 1, wherein the document is a HyperText Markup Language (HTML) document.

9. A digital television decoder for displaying a document on a display screen capable of being subjected to a scroll procedure, configured to:

allocate to the document a quantity of graphics memory to create a buffer memory of a visible part of the document and for an anticipation band of zones closest in physical proximity to the visible part of the document, wherein the anticipation band comprises content anticipated to be shown in the visible part of the document after the document is scrolled;

calculate and chop the buffer memory into pixmaps as a function of a size of the document, of the visible part, and of the anticipation band, relatively position the pixmaps with respect to the complete document and the visible part, fill the content of the pixmaps with a priority system dependent on a proximity of the pixmap with respect to the visible part, wherein filling the content of the pixmaps is carried out as a background task, when the document is subjected to a display procedure or to a scrolling, copy the content in the pixmaps of the anticipation band into the visible window and redrawing the anticipation band wherein when the content to be copied is not ready for display, force updating of the pixmaps to be displayed in the visible part prior to copying the content, and relatively position the pixmaps with respect to the documents as a function of the new position of the visible part.

10. The digital television decoder as claimed in claim 9, wherein the anticipation band comprises a minimum of: one column of pixmaps on the right and on the left of the visible window, and a row of pixmaps at the bottom and at the top of the visible part of the document, except in the case where the visible part approaches an edge of the document.

11. The digital television decoder as claimed in claim 9, wherein the pixmaps are chopped into rectangles which are drawn successively with each call of a background task.

12. The digital television decoder as claimed in claim 11, wherein the background task constructs the anticipation band.

13. The digital television decoder as claimed in claim 11, wherein each call of the background task, comprises:

reorganization of the pixmaps after a scroll of the document has been performed, and when no repositioning of the pixmaps has occurred, drawing of the first rectangle of a pixmap determined as a function of distance away from the visible part of the documents.

14. The digital television decoder as claimed in claim 9, wherein a synchronization mechanism is used to allow the forcing of the data to be displayed into the pixmaps.

15. The digital television decoder as claimed in claim 9, wherein an immediate drawing is carried out when one of:

an "expose" event compels the drawing of a part of the visible window that has not been drawn in the anticipation band, and an element of the document is modified graphically in the display window.

16. The digital television decoder as claimed in claim 9, wherein the document is a HyperText Markup Language (HTML) document.

* * * * *